United States Patent Office 3,207,765
Patented Sept. 21, 1965

3,207,765
PROCESS FOR PRODUCTION OF VINYL TRIMELLITATES
Philip John Paré, Yorktown Heights, N.Y., assignor to American Cyanamid Company, Stamford, Conn., a corporation of Maine
No Drawing. Filed Mar. 11, 1963, Ser. No. 264,036
4 Claims. (Cl. 260—346.3)

This invention relates to a novel process for the production of vinyl trimellitate-1,2-anhydrides and derivatives thereof and to the products produced thereby. More particularly, this invention relates to a novel process for the production of vinyl trimellitate-1,2-anhydrides and derivatives thereof which comprises reacting a trimellitic anhydride with a zinc or cadmium compound and then contacting the resultant reaction media with acetylene. Still more particularly, this invention relates to a novel group of vinyl monomers which may be polymerized into novel polymers or treated to form novel derivatives thereof, which in turn may be polymerized into novel polymers.

I have discovered a novel process wherein vinyl trimellitate-1,2-anhydrides can be produced. The products of such a process, to my knowledge, have never been prepared and, as can be seen from Formula II, below, the compounds are free to react by polymerization via two different functional groups. That is to say, polymerization may be effected through the anhydride function and the resultant polymer may then be internally cross-linked through the vinyl group to produce a new type of thermoset resin or a vinyl polymerization may be conducted to produce vinyl-type homopolymers and copolymers. Additionally, derivatives of the monovinyl esters such as the diacids, the diesters, the substituted diesters, amides and the like may be produced, which derivatives may also be polymerized to form new and useful homopolymers and copolymers.

It is an object of the present invention to present a novel process for the production of vinyl trimellitate-1,2-anhydrides and derivatives thereof and to products produced thereby.

It is another object of the present invention to present a novel process for the production of vinyl trimellitate-1,2-anhydrides which comprises (1) reacting a trimellitic acid-1,2-anhydride with a zinc or cadmium compound and then (2) contacting the resulting reaction media with acetylene.

It is a further object of the present invention to provide a new group of vinyl monomers which may be polymerized into novel polymers or treated to produce various novel derivatives thereof which may also be polymerized to form novel polymeric materials.

These and other objects of the present invention will become more apparent to one skilled in the art upon reading the more detailed description set forth hereinbelow.

THE NOVEL VINYLATION PROCESS

The novel vinylation process for the production of the novel vinyl trimellitate-1,2-anhydrides of the present invention is a two-step process. The first step comprises (A) reacting (1) an anhydride compound represented by the formula (I) 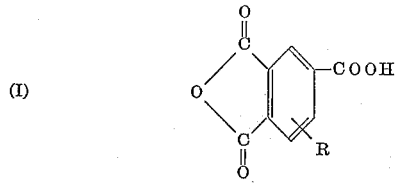

wherein R is hydrogen or a halogen, cyano or lower alkyl radical having 1 to 4 carbon atoms, inclusive, with (2) a zinc or cadmium oxide or acetate.

Compounds which are represented by Formula I and therefore are useful as the charge materials to my novel vinylation process include Trimellitic acid-1,2-anhydride,
3-chlorotrimellitic acid-1,2-anhydride,
5-chlorotrimellitic acid-1,2-anhydride,
6-chlorotrimellitic acid-1,2-anhydride,
3-bromotrimellitic acid-1,2-anhydride,
5-bromotrimellitic acid-1,2-anhydride,
6-bromotrimellitic acid-1,2-anhydride,
3-cyanotrimellitic acid-1,2-anhydride,
5-cyanotrimellitic acid-1,2-anhydride,
6-cyanotrimellitic acid-1,2-anhydride,
3-methyltrimellitic acid-1,2-anhydride,
5-methyltrimellitic acid-1,2-anhydride,
6-methyltrimellitic acid-1,2-anhydride,
3-ethyltrimellitic acid-1,2-anhydride,
5-ethyltrimellitic acid-1,2-anhydride,
6-ethyltrimellitic acid-1,2-anhydride,
3-n-propyltrimellitic acid-1,2-anhydride,
5-n-propyltrimellitic acid-1,2-anhydride,
6-n-propyltrimellitic acid-1,2-anhydride,
3-isopropyltrimellitic acid-1,2-anhydride,
5-isopropyltrimellitic acid-1,2-anhydride,
6-isopropyltrimellitic acid-1,2-anhydride,
3-n-butyltrimellitic acid-1,2-anhydride,
5-n-butyltrimellitic acid-1,2-anhydride,
6-n-butyltrimellitic acid-1,2-anhydride,
3-t-butyltrimellitic acid-1,2-anhydride,
5-t-butyltrimellitic acid-1,2-anhydride,
6-t-butyltrimellitic acid-1,2-anhydride,
3-isobutyltrimellitic acid-1,2-anhydride,
5-isobutyltrimellitic acid-1,2-anhyride,
6-isobutyltrimellitic acid-1,2-anhydride, and the like.

The reaction may be conducted at a temperature of at least 300° C., and preferably at a temperature ranging from about 325° C. to about 400° C. and at atmospheric pressure. Subatmospheric or superatmospheric pressures may alternatively be employed if necessary or desirable without detracting from the efficacy of the process, except for the necessity of minor equipment variations.

The concentration of the cadmium or zinc compound employed generally ranges from about 2% to about 20%, by weight, preferably about 8% to about 15%, by weight, based on the weight of the anhydride employed. At a concentration of much less than 2%, the reaction proceeds very slowly, and, in terms of practicality, essentially no reaction occurs. At concentrations somewhat higher than 20%, no additional increase in the rate of reaction has been observed. It can therefore be seen that the above-enumerated concentration range regarding the cadmium or zinc compound is governed more by practicality than by criticality.

The salts formed in step (A) form a part of the reaction media charged to step (B) of my novel process and tend to function as catalysts or initiators for the vinylation of the remaining unreacted trimellitic acid-1,2-anhydride in the reaction media.

The reaction media resulting from the reaction of the trimellitic acid-1,2-anhydride with the metal compound is then anhydrous since water vapor continually is removed during the reaction. However, the media may be further dehydrated by distillation, or other treatment, if desired or necessary in order to remove water of reaction therefrom. The water-free reaction media composed of the unreacted trimellitic acid-1,2-anhydride and the metal salt is then used as a charge for step (B) of my novel process.

The second step of my novel process comprises (B) reacting (3) the metal salt-trimellitic acid-1,2-anhydride reaction mixture produced in step (A), as described above, with (4) acetylene, under an acetylene partial pressure of at least about 150 p.s.i. and not more than about 400 p.s.i., preferably from about 250 p.s.i. to about 350 p.s.i. As with the metal compound concentrations mentioned above, the acetylene partial pressure is governed more by practicality than criticality. At pressures less than about 150 p.s.i. the reaction proceeds very slowly, while at pressures above about 400 p.s.i. the acetylene may tend to react explosively.

Step (B) of my novel process may be carried out in the molten state or in solution. That is to say, the mixture of the trimellitic acid-1,2-anhydride and metal salt formed in step (A), may be used as such, as a molten mass, or in a solvent system. Because of the ease of application and control, it is preferred that a solvent system be employed, however, the novel process of the present invention is not limited in scope to such a system. When a solvent system is employed, such solvents as the aromatic hydrocarbons, e.g. benzene, xylene, toluene, etc., are preferred while other materials, such as the aliphatic hydrocarbons having from 6 to 12 carbon atoms, e.g. hexane, heptane, etc., are also applicable.

The acetylene reaction, step (B), is conducted at a temperature of at least 200° C. and preferably at a temperature ranging from about 225° C. to about 300° C. Higher temperatures enhance the possibility of an explosive reaction upon the introduction of the acetylene gas, as mentioned above, while lower temperatures inhibit the reaction altogether.

Although the reaction may be conducted in the presence of trace amounts of air, it is preferred to conduct the acetylene reaction in an inert atmosphere since a slight polymerization of the reaction product tends to result when air is present, thereby reducing the amount of possible recoverable vinyl compound. Any known inert gaseous material may be used to produce the inert conditions with such compounds as nitrogen, carbon dioxide, argon, neon, normally gaseous hydrocarbons such as butane, propane, and the like, being exemplary.

The time of contact of the acetylene gas with the dehydrated reaction media resulting from step (A) is not critical, however, longer reaction times effect a greater conversion and tend to produce a greater yield of reaction product and are therefore, for reasons of practicality, preferred.

THE VINYL TRIMELLITATE COMPOUNDS

As mentioned above, the vinyl trimellitate-1,2-anhydrides produced by the above-enumerated two-step process are novel and, as such, fall within the scope of the present invention. These novel compounds can be represented by the general formula (II) 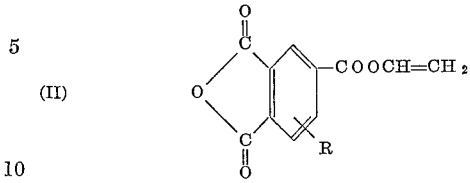

wherein R is as set forth above in regard to Formula I.

Examples of compounds which correspond to Formula II and therefore form part of the instant invention include:

Vinyl trimellitate-1,2-anhydride,
Vinyl-3-chlorotrimellitate-1,2-anhydride,
Vinyl-5-chlorotrimellitate-1,2-anhydride,
Vinyl-6-chlorotrimellitate-1,2-anhydride,
Vinyl-3-bromotrimellitate-1,2-anhydride,
Vinyl-5-bromotrimellitate-1,2-anhydride,
Vinyl-6-bromotrimellitate-1,2-anhydride,
Vinyl-3-cyanotrimellitate-1,2-anhydride,
Vinyl-5-cyanotrimellitate-1,2-anhydride,
Vinyl-6-cyanotrimellitate-1,2-anhydride,
Vinyl-3-methyltrimellitate-1,2-anhydride,
Vinyl-5-methyltrimellitate-1,2-anhydride,
Vinyl-6-methyltrimellitate-1,2-anhydride,
Vinyl-3-ethyltrimellitate-1,2-anhydride,
Vinyl-5-ethyltrimellitate-1,2-anhydride,
Vinyl-6-ethyltrimellitate-1,2-anhydride,
Vinyl-3-n-propyltrimellitate-1,2-anhydride,
Vinyl-5-n-propyltrimellitate-1,2-anhydride,
Vinyl-6-n-propyltrimellitate-1,2-anhydride,
Vinyl-3-isopropyltrimellitate-1,2-anhydride,
Vinyl-5-isopropyltrimellitate-1,2-anhydride,
Vinyl-6-isopropyltrimellitate-1,2-anhydride,
Vinyl-3-n-butyltrimellitate-1,2-anhydride,
Vinyl-5-n-butyltrimellitate-1,2-anhydride,
Vinyl-6-n-butyltrimellitate-1,2-anhydride,
Vinyl-3-t-butyltrimellitate-1,2-anhydride,
Vinyl-5-t-butyltrimellitate-1,2-anhydride,
Vinyl-6-t-butyltrimellitate-1,2-anhydride,
Vinyl-3-isobutyltrimellitate-1,2-anhydride,
Vinyl-5-isobutyltrimellitate-1,2-anhydride,
Vinyl-6-isobutyltrimellitate-1,2-anhydride, and the like.

The novel vinyl trimellitate compounds are generally crystalline solids having melting points of at least about 129° C. They are soluble in water, acetone and other organic solvents and are most useful for the production of polymers, a more definite discussion of which is set forth hereinbelow.

THE VINYL TRIMELLITATE DERIVATIVES

The compounds set forth hereinabove, represented by Formula II, may be reacted at the anhydride radical, utilizing various reaction conditions, to produce various novel vinyl trimellitate derivatives which may be characterized by the formula (III) 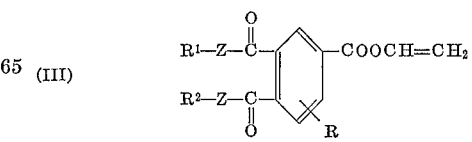

wherein R is as defined above in regard to Formula I and Z is either oxygen or an NH radical and when Z is oxygen, $R^1$ and $R^2$ are individually either hydrogen, an alkyl radical of from 1 to 4 carbon atoms, inclusive, or an aryl radical of 6 to 10 carbon atoms, inclusive, and when Z is NH, $R^1$ and $R^2$ are the same.

Compounds which correspond to Formula III and therefore also form part of the present invention include:

4-vinyl-trimellitate, 4-vinyl-3-chlorotrimellitate,
4-vinyl-5-chlorotrimellitate, 4-vinyl-6-chlorotrimellitate,
4-vinyl-3-bromotrimellitate, 4-vinyl-5-bromotrimellitate,
4-vinyl-6-bromotrimellitate, 4-vinyl-3-cyanotrimellitate,
4-vinyl-5-cyanotrimellitate, 4-vinyl-6-cyanotrimellitate,
4-vinyl-3-methyltrimellitate, 4-vinyl-5-methyltrimellitate,
4-vinyl-6-methyltrimellitate, 4-vinyl-3-ethyltrimellitate,
4-vinyl-5-ethyltrimellitate, 4-vinyl-6-ethyltrimellitate,
4-vinyl-3-n-propyltrimellitate, 4-vinyl-5-n-propyltrimellitate,
4-vinyl-6-n-propyltrimellitate, 4-vinyl-3-isopropyltrimellitate, 4-vinyl-5-isopropyltrimellitate,
4-vinyl-6-isopropyltrimellitate, 4-vinyl-3-n-butyltrimellitate,
4-vinyl-5-n-butyltrimellitate, 4-vinyl-6-n-butyltrimellitate,
4-vinyl-3-t-butyltrimellitate, 4-vinyl-5-t-butyltrimellitate,
4-vinyl-6-t-butyltrimellitate, 4-vinyl-3-isobutyltrimellitate, 4-vinyl-5-isobutyltrimellitate,
4-vinyl-6-isobutyltrimellitate, 1-methyl-4-vinyltrimellitate,
2-ethyl-4-vinyltrimellitate, 2-propyl-4-vinyltrimellitate,
1-n-butyl-4-vinyltrimellitate, 2-phenyl-4-vinyltrimellitate,
1-xylyl-4-vinyltrimellitate, 2-naphthyl-4-vinyltrimellitate,
1-methyl-4-vinyl-3-chlorotrimellitate,
1-phenyl-4-vinyl-6-cyanotrimellitate,
2-ethyl-4-vinyl-5-methyltrimellitate,
1,2-dimethyl-4-vinyltrimellitate,
1,2-diethyl-4-vinyl-3-bromotrimellitate,
1,2-dipropyl-4-vinyl-5-cyanotrimellitate,
1,2-dibutyl-4-vinyltrimellitate,
1,2-diphenyl-4-vinyltrimellitate,
1,2-dinaphthyl-4-vinyltrimellitate,
1-methyl-2-phenyl-4-vinyltrimellitate,
1-butyl-2-ethyl-4-vinyl-3-chlorotrimellitate,
1-butyl-2-ethyl-4-vinyl-5-cyanotrimellitate,
1-butyl-2-propyl-4-vinyl-5-bromotrimellitate,
1-ethyl-2-methyl-4-vinyl-6-methyltrimellitate,
1-phenyl-2-propyl-4-vinyl-5-butyltrimellitate,
Vinyl-3,4-dicarbamoyl benzoate,
Vinyl-3,4-bis(methylcarbamoyl) benzoate,
Vinyl-3,4-bis(ethylcarbamoyl) benzoate,
Vinyl-3,4-bis(propylcarbamoyl) benzoate,
Vinyl-3,4-bis(butylcarbamoyl) benzoate,
Vinyl-2-chloro-3,4-dicarbamoyl benzoate,
Vinyl-2-chloro-3,4-bis(methylcarbamoyl) benzoate,
Vinyl-5-chloro-3,4-bis(ethylcarbamoyl) benzoate,
Vinyl-6-cyano-3,4-bis(phenylcarbamoyl) benzoate,
Vinyl-2-bromo-3,4-bis(butylcarbamoyl) benzoate,
Vinyl-5-methyl-3,4-bis(methylcarbamoyl) benzoate,
Vinyl-6-n-butyl-3,4-bis(methylcarbamoyl) benzoate,
and the like.

Each of the novel derivatives represented by Formula III may be produced by known reactions and under known reaction conditions such as those utilized to produce the acids, esters and carbamoyl derivatives of other anhydrides, as specified immediately below and in the examples hereinafter set forth. For instance, the diacid derivatives may be produced by contacting a vinyl trimellitate-1,2-anhydride with water and a solvent, such as acetone, at reflux temperatures, for from about 30 minutes to 3 hours. The anhydride linkage cleaves and the diacid derivative results.

The monoesters may be prepared directly from the vinyl trimellitate-1,2-anhydrides or from the diacid derivatives thereof. Utilizing the 1,2-anhydride as the charge material, the reaction is conducted, under known reaction conditions, by the reaction with one-half the molar equivalent of an aliphatic or aromatic alcohol. Utilizing the diacid derivatives of the present invention, the monoesters may be produced by contacting them, under the same reaction conditions, with the same amount of an aliphatic or aromatic alcohol and in the presence of an acid catalyst such as hydrochloric acid, nitric acid, sulfuric acid, p-toluene sulfonic acid and the like.

The diesters and mixed diesters of the present invention may also be produced directly from the vinyl trimellitate-1,2-anhydrides or their diacid derivatives. When the diacid derivatives are used, any known reaction for the esterification of an acid with an alcohol may be used. However, utilizing the anhydride as the charge, a diester may be produced by contacting the vinyl trimellitate with an aromatic or aliphatic alcohol in the presence of an acid catalyst, such as those indicated above. A second typical procedure, as well as a general disclosure of ester production techniques, for the production of the diesters of the present invention is described in U.S. Patent No 1,554,032, as well as Weissenberger et al., Monatshefte füer Chemie, 45, page 395, both references hereby being incorporated into the instant specification by reference. When the mixed diesters are desired, the vinyl trimellitate or diacid derivative thereof a first formed into a monoester, as indicated above, which is then further reacted with another alcohol to produce the desired mixed diester, generally under the diester reaction conditions indicated above in each case.

The diamide derivatives of the vinyl trimellitates of the instant invention, may also be produced by known methods, as indicated above, for the production of amides from anhydrides. A preferred method for the diamide production comprises reacting the diesters or mixed diesters disclosed above, with, for example, ammonium hydroxide, or an amine properly substituted to achieve the desired substitution on the amide derivative. The ammonium hydroxide is generally employed at a 20% concentration and the reaction is carried out at a temperature of at least about 23° C. A typical procedure for the production of an amide is set out in an article by Röhms et al., J. Praht Chem., 158, page 112, 1941, which article is hereby incorporated into the instant specification by reference.

Although the vinyl trimellitate-1,2-anhydrides, the diacids, the monoesters, the diesters and the diamides may be used, as such, for many purposes such as the production of plasticizers, adhesives, as charge materials for the production of salts and other chemicals, pigments, dyes and the like, their main field of application lies in the formation of resinous polymers. A more concise disclosure of the production thereof is set forth hereinbelow.

THE POLYMERS

As previously mentioned, the compounds represented by Formulae II and III above are capable of being reacted to form the novel resinous polymeric compositions which also form part of the instant invention.

Generally, the most useful way to form polymeric products from the compounds represented by Formula III is to polymerize the monomer through the anhydride linkage and then cross-link the resultant polymer via the vinyl group. The monomers of Formula II form polyester resins and alkyd-type resins similar to other anhydrides. That is to say, the novel vinyl trimellitate-1,2-anhydrides may be reacted with alcohols, under appropriate conditions, to form thermosetting polyester resins.

Any of the large class of polyhydric alcohols ordinarily used in preparing reactive polyester resins may be employed in the practice of the present invention. While dihydric alcohols, and especially saturated aliphatic diols, are preferred as co-reactants in the preparation of the polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,5, hexanediol-1,6, neopentyl glycol and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol and the like, as well as mixtures thereof.

The novel vinyl trimellitate-1,2-anhydrides of the present invention may be used alone to form the polyester resins or in combination with unsaturated acids in the formation of thermosetting resins in order to impart many beneficial properties thereto. For example, non-polymerizable polycarboxylic acids having only two carboxyl groups, and no other reactive substituents, may be employed to impart a desirable degree of flexibility which may not be achieved by the use of the vinyl trimellitate-1,2-anhydrides alone. Where such non-polymerizable polycarboxylic acids are employed, the amount thereof should constitute at least about 20% but not more than about 80% of the total equivalents of carboxyl groups present in the esterification mixture. Preferably, such non-polymerizable polycarboxylic acids may be employed in amounts ranging from about 25% to about 75% of the total equivalents of carboxyl groups present in the esterification mixture.

Examples of the $\alpha,\beta$-ethylenically unsaturated polycarboxylic acids which may be used for producing the polyester resins, include maleic, fumaric, citraconic, $\gamma,\gamma$-dimethylcitraconic, mesaconic, itaconic, $\alpha$-methylitaconic, $\gamma$-methylitaconic, teraconic, and the like, as well as mixtures thereof, but minor amounts of $\alpha,\beta$-ethylenically unsaturated polycarboxylic acids containing three or more carboxyl groups, such as aconitic acids and the like, together with the particular $\alpha,\beta$-ethylenically unsaturated dicarboxylic acid or acids chosen, may also be used.

Whenever available, the anhydrides or any of the aforementioned $\alpha,\beta$-ethylenically unsaturated polycarboxylic acids may be substituted for said acids in whole or in part.

Halogenated unsaturated polycarboxylic acids may also be employed in the preparation of the thermosetting polyester resins of the present invention for purposes of imparting various desirable properties thereto as mentioned above in regard to the saturated acids. Examples of halogenated acids which may be used include monochloro- and monobromomaleic, monochloro- and monobromofumaric, monochloro- and monobromomalonic, dichloro- and dibromomalonic, monochloro- and monobromosuccinic, $\alpha,\beta$-dichloro- and dibromosuccinic, hexachloroendomethylenetetrahydrophthalic, and the like, as well as mixtures thereof. Whenever available, the anhydrides of any of these halogenated acids may also be substituted therefore in whole or in part.

The esterification mixtures, from which the polyester resins employed in the practice of the present invention are prepared, are generally formulated so as to contain at least a stoichiometric balance between carbonyl and hydroxyl groups. Thus, where a diol and a vinyl trimellitate-1,2-aldehyde are employed, they are usually reacted on at least a mol to mol basis. In common commercial practice, a small excess of polyol, usually in the range of from about 5% to about 15% excess, is employed. This is done primarily for economic reasons, i.e. to insure a rapid rate of esterification.

The polyester resins produced in the practice of the present invention are formed in the manner customarily observed in the art. Thus, the vinyl trimellitate-1,2-anhydride, alone, or with other acids, and polyol or polyols employed, are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus the reaction will preferably be carried out at a temperature which usually will be just below the boiling point of the most volatile component of the reaction mixture, generally the polyol.

The esterification mixture should be sufficiently reacted so as to ultimately produce a polyester having an acid number not appreciably more than about 75. It is preferred to employ polyester resins having acid numbers ranging from about 30 to about 50.

Further details pertaining to the preparation of polyester resins of the types employed in the practice of the present invention are disclosed in U.S. Patent No. 2,255,313 to Ellis, and in U.S. Patent Nos. 2,443,735 to 2,443,741, inclusive, to Kropa and these patents are hereby incorporated into the present application by reference.

The polyester resins of the present invention may be cross-linked through the available vinyl group by the addition of a suitable cross-linking agent, as mentioned above.

The polyester resins are cross-linked by admixing them with a monomer compound containing a polymerizable $CH_2=C<$ group to give a composition that may be cured to a stable thermoset condition. One may use about 10 parts by weight of the monomeric material to about 90 parts by weight of the polyester resin up to about 60 parts of the monomeric material to about 40 parts of the polyester resin. The preferred embodiment, however, is to use from about 25 parts of the monomeric material to about 35 parts of the monomeric material with about 75 parts to about 65 parts, respectively, of the polyester resin.

The monomeric material containing the polymerizable $CH_2=C<$ group which may be used in the practice of the present invention, has a boiling point of at least 60° C. Among the polymerizable monomeric materials that will find use in my invention are those such as styrene, sidechain alkyl and halo substituted styrenes such as alpha methylstyrene, alpha chlorostryene, alpha ethylstyrene and the like or alkyl and halo ring-substituted styrenes such as ortho, meta and paraalkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetra-hydrophthalic anhydride, and diallyl ester of tetrachloroendomethylenetetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like. These monomeric materials may be used either singly or in combination with one another.

When the thermosetting polyester resin is combined with the cross-linking monomeric material, it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical di-(beta-naphthyl)-p-phenylene diamine, phenolic resins, sulfur compounds and the like. The concentration of the inhibitor is preferably and as a general rule less than 1% by weight is usually sufficient. However, with the preferred inhibitors, e.g., polyhydric phenols and aromatic amines, one may make use of such small amounts as 0.01% to 0.1%, by weight.

The compositions of the present invention will find application in a great plurality of fields such as in the preparation of laminates and other reinforced plastics, coating compositions, adhesive compositions, molding compositions, potting, films, foils, fibers and the like.

The thermosetting polyester resins can readily be solidified without benefit of catalyst by the application of heat or by the application of heat and pressure. However, in such an operation without benefit of a catalytic agent the time element makes it desirable to incorporate into the composition conventional polymerization catalysts such as the organic peroxides, the alcoholic and acidic peroxides. Among the preferred catalysts are: the acidic peroxides, e.g., benzoyl peroxide, phthalic peroxide, succinic peroxide and benzoyl acetic peroxide; fatty oil acid peroxides, e.g., coconut oil acid peroxides, lauric peroxide, stearic peroxide and oleic peroxide; alcohol peroxides, e.g., tertiary-butyl hydroperoxide, usually called tertiary-butyl peroxide and terpene oxides, e.g., ascaridole. Still other polymerization catalysts might be used in some instances, e.g., soluble cobalt salts (particularly the linoleate and naphthenate), p-toluene sulfonic acid, aluminum chloride, stannic chloride and boron trifluoride and azobisisobutyronitrile.

As mentioned above, the method used to prepare the polyester resins used in the formation of the novel compositions of the present invention is not critical and any known method may be used.

While the previous discussion has been directed primarily to the production of polyester resins, the compounds represented by Formula II, as well as the novel derivatives of the present invention represented by Formula III, may alternatively by regarded solely as vinyl compounds and be homopolymerized and copolymerized in the same manner as other compounds containing a polymerizable $CH_2=C<$ group. That is to say, the monomers represented by Formulae II and III may be polymerized to novel vinyl polymers by contacting them with various free-radical generating catalysts under known reaction conditions. Illustrative of the applicable catalysts which may be used are the inorganic peroxides, e.g., hydrogen peroxide, barium peroxide, magnesium peroxide, etc., and the various organic peroxy catalysts, illustrative examples of which are: the dialkyl peroxides, e.g., diethyl peroxide, dipropyl peroxide, dilauryl peroxide, dioleyl peroxide, distearyl peroxide, di-tertiary-butyl) peroxide, and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g. coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-acids, e.g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following: tetralin hydroperoxide, tertiary-butyl diperphthalate, cumene hydroperoxide, tertiary-butyl perbenzoate, 2,4-dichlorobenzoyl peroxide, urea peroxide, caprylyl peroxide, p-chlorobenzoyl peroxide, 2,2-bis(tertiary-butyl peroxy) butane, hydroxyheptyl peroxide and diperoxide of benzaldehyde. Other so-called "free radical" types of catalysts, e.g., $\alpha,\alpha'$-azodiisobutyronitrile, nitrilotrispropionamide, also can be used to accelerate polymerization.

Illustrative examples of water-soluble activators (water-soluble polymerization adjuvants) of the catalyst are oxygen-containing sulfur compounds which are capable of undergoing oxidation, for instance, sulfur dioxide, the alkali metal (e.g., sodium, potassium, etc.) bisulfites, hydrosulfites, thiosulfate, sulfurous acid (or compounds which engender sulfurous acid, e.g., alkali metal sulfites, ethyl and other alkyl sulfites, etc.), various organic sulfinic acids, e.g., p-toluene sulfinic acid, formamidine sulfinic acid, etc.

The amount of catalyst used may be varied widely depending upon the particular catalyst utilized and the other polymerization conditions and may range generally from about 0.1% to about 5%, by weight, or even as high as 10%, by weight, based on the weight of monomer utilized. Preferably, the amount of catalyst is within the range of from about 0.1% to about 3% or 4%, by weight, of the monomer being polymerized. The polymerization reaction may be carried out under an inert atmosphere.

The polymerization reaction may be carried out within a temperature range of from about 25° C. to about 125° C., preferably within the range of from about 60° C. to 100° C.

Residence time of the reactants in the reaction zone may also be controlled for optimum results. I have found that the residence time may vary from as little as 30 minutes to as much as 96 hours. However, it is preferred that the residence time be within the order of from about 2 hours to about 6 hours. Obviously, it is preferred that the residence time in the reaction zone be a minimum in view of various economic considerations. The reaction is preferably carried out at atmospheric pressure although obviously, subatmospheric and superatmospheric pressures may be used as desired. The resultant polymeric materials are water-insoluble and are usually recovered in excellent yields from the reaction media by precipitation with a known non-solvent therefor.

The polymers may be produced in the form of homopolymers of the novel compounds claimed herein, and also copolymers of the novel compounds claimed herein, or copolymers of the novel compounds claimed herein with various copolymerizable monomers containing a $CH_2=C<$ group.

When preparing copolymers of the novel monomers of the present invention with other copolymerizable monomers it is generally acceptable to use a weight ratio of from about 1% to about 50% of the novel vinyl trimellitate compounds of the present invention with about 99% to 50% of the unsaturated monomers polymerizable therewith, however it is preferred to use a weight ratio of about 5% to about 30% of the novel trimellitate monomers with about 95% to 70% of the monomers copolymerizable therewith.

Examples of monomers which can be copolymerized with the novel monomers of the present invention, and which can be copolymerized either singly or in a plurality (two, three, four or any desired number), the latter often being desirable in order to improve the compatibility and copolymerization characteristics of the mixture of monomers and to obtain new and valuable copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc. and arylacrylic, e.g., phenylacrylic, etc.), i.e., methyl methacrylate, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthtalic, benzoylphthalic, etc., acids; the saturated monohydric alcohol esters, e.g., the methyl, ethyl, propyl, isopropyl, butyl, sec.-butyl, amyl, etc., esters, of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; butadienes, e.g., 1,3-butadiene, 2-chlorobutadiene, etc.; unsaturated polyhydric alcohol (e.g. butenediol, etc.) esters of saturated and unsaturated, aliphatic and aromatic monobasic and polybasic acids.

Other examples of monomers that can be copolymerized with the monomers of the present invention are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that can be copolymerized with the monomers of the present invention are allyl alcohol, methallyl alcohol, diallyl carbonate, allyl lactate, allyl alpha-hydroxyisobutyrate, allyl trichlorosilane, diallyl methylglutonate, diallyl tartronate, diallyl tartrate, diallyl mesaconate, the diallyl ester of muconic acid, diallyl chlorophthalate, diallyl dichlorosilane, the diallyl ester of endomethylene-tetrahydrophthalic anhydride, triallyl tricarbalylate, triallyl cyanurate, triallyl citrate, triallyl phosphate, tetrallyl silane, tetrallyl silicate, hexallyl disiloxane, etc. Other examples of allyl compounds that may be employed are given, for example, in United States Patent No. 2,510,503, issued June 6, 1950.

Among the comonomers which are preferred for use in carrying our invention into effect are, for example, compounds such as acrylonitrile, the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc. acrylamides, and meth- acrylamides. Other monomers copolymerizable with the instant novel monomers are given, for instance, in U.S. Patent No. 2,601,572, dated June 24, 1952, where examples are given both by classes and species.

The novel polymers may be reinforced, colored, etc., as the need may be, by the incorporation of materials such as dyes, pigments, lubricants, plasticizers, fillers and the like.

The polymers may be used for the production of films, fibers, foils, molding compounds, adhesives, or various resin modifiers to impart rigidity, toughness, etc. thereto and the like.

The following examples are set forth for purposes of illustration only and are not to be construed as limitations on the instant invention. All parts and percentages are by weight unless otherwise specified.

*Example 1.—Preparation of Vinyl trimellitate-1,2-anhydride*

To a suitable reaction vessel are added 288 parts of trimellitic acid-1,2-anhydride. The material is heated to 335° C. and zinc oxide, 18.5 parts, is then slowly added to the molten anhydride thus dissolving the zinc oxide. The reaction is allowed to continue for 30 minutes. Water vapor is liberated from the vessel continuously during the reaction and the anhydrous zinc salt-unreacted trimellitic acid-1,2-anhydride reaction media is recovered. The zinc salt-trimellitic acid-1,2-anhydride mixture and 600 parts of xylene are then added to a second reaction vessel. The vessel is sealed, flushed thoroughly with $N_2$ and heated to 260° C. whereupon 25 atm. of acetylene gas is added. The reaction is allowed to continue for 10 hours with intermittent additions of acetylene being charged to maintain a total pressure between 22–26 atms. at the reaction temperature of 260° C.

Following the reaction, the reaction product is filtered to remove unreacted material. There remains 718 parts of clear dark brown liquid. A brown, solid material is then precipitated by the addition of 1500 parts of cold cyclohexane. Following decantation of the xylene-cyclohexane solution, vinyl trimellitate-1,2-anhydride is recovered by extraction of the precipitated solids with boiling cyclohexane in a yield of 152 parts, corresponding to a 48% conversion of starting acid. The vinyl trimellitate-1,2-anhydride is further purified by sublimation at low pressure to give a pure monomer which melts at 129.5 to 130.5° C.

| Analysis | $C_{11}$ | $H_6$ |
|---|---|---|
| Calc. | 60.55 | 2.78 |
| Found | 60.40 | 2.88 |

*Example 2.—Preparation of vinyl-3-chlorotrimellitate-1,2-anhydride*

Following the procedure of Example 1, 226 parts of 3-chlorotrimellitic acid-1,2-anhydride are reacted with 13.0 parts of cadmium oxide. After the acetylene addition and subsequent recovery of the product, a yield of 52% of vinyl-3-chlorotrimellitate-1,2-anhydride is recovered.

*Example 3.—Preparation of vinyl-5-cyanotrimellitate-1,2-anhydride*

The procedure of Example 1 is again followed in every detail except that 5-cyanotrimellitic acid-1,2-anhydride and zinc acetate are employed. A yield of 46% of vinyl-5-cyanotrimellitate-1,2-anhydride is recovered.

*Example 4.—Preparation of vinyl-6-methyltrimellitate-1,2-anhydride*

Again following the procedure of Example 1, 160 parts of vinyl-6-methyltrimellitate-1,2-anhydride are recovered utilizing, as charge materials in place of the trimellitic acid-1,2-anhydride and zinc oxide, 6-methyltrimellitic acid-1,2-anhydride and cadmium acetate, respectively.

*Example 5.—Preparation of 3-n-butyltrimellitate-1,2-anhydride*

248 parts of 3-n-butyltrimellitic acid-1,2-anhydride and 15.5 parts of zinc oxide are reacted in a suitable reaction vessel according to the process of Example 1. A yield of 61% of 3-n-butyltrimellitate-1,2-anhydride is recovered.

*Example 6.—Preparation of 4-vinyl trimellitate*

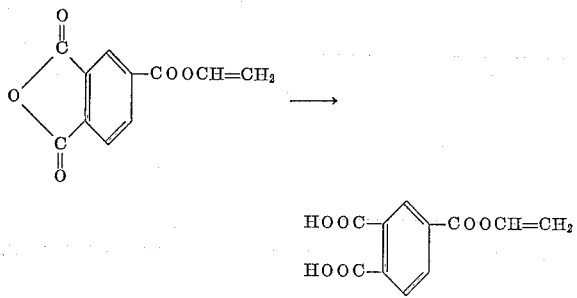

Twenty-two parts of vinyl trimellitate-1,2-anhydride, produced as in Example 1, are added to a solution of 200 parts of water and 200 parts of acetone. The mixture is refluxed for 1.5 hours at which point there is a homogeneous solution. After treatment of this solution with 5 parts of decolorizing carbon and filtering, the desired product is isolated in a 91% conversion by crystallization from the water-acetone mixture. The pure material, 4-vinyl trimellitate, melts at 184–186° C. and has an infrared spectrum consistent with the structure.

| Analysis | $C_{11}$ | $H_8$ |
|---|---|---|
| Calc | 55.97 | 3.41 |
| Found | 56.25 | 3.55 |

Table I, below, teaches the production of various diacid derivatives of vinyl-1,2-anhydrides. The procedure followed was that set forth in Example 6.

TABLE I

| Example | Feed material | Product | Percent yield |
|---|---|---|---|
| 7 | Vinyl-3-chlorotrimellitate-1,2-anhydride. | 4-vinyl-3-chlorotrimellitate. | 92 |
| 8 | Vinyl-5-cyanotrimellitate-1,2-anhydride. | 4-vinyl-5-cyanotrimellitate. | 87 |
| 9 | Vinyl-6-methyltrimellitate-1,2-anhydride. | 4-vinyl-6-methyltrimellitate. | 89 |
| 10 | Vinyl-3-n-butyltrimellitate-1,2-anhydride. | 4-vinyl-3-n-butyltrimellitate. | 86 |

*Example 11.—Preparation of 1-methyl-4-vinyl trimellitate*

21.8 parts of the vinyl trimellitate-1,2-anhydride are reacted with 64 parts of dry methanol in a suitable reaction vessel. The reaction is conducted at 65° C. for one hour in the absence of any further catalyst. Following this, the solution is concentrated by removal of methanol and the product isolated by crystallization. A yield of 86% of the title compound is recovered.

Following the procedure of Example 11, the following monoester derivatives are produced as set forth in Table II.

TABLE II

| Example | Feed material | Alcohol | Product | Percent yield |
|---|---|---|---|---|
| 12 | Vinyl-3-chlorotrimellitate-1,2-anhydride. | $CH_3OH$ | 1-methyl-4-vinyl-3-chlorotrimellitate. | 82 |
| 13 | Vinyl-6-t-butyltrimellitate-1,2-anhydride. | $C_2H_5OH$ | 1-ethyl-4-vinyl-6-t-butyltrimellitate. | 68 |
| 14 | Vinyl-5-cyanotrimellitate-1,2-anhydride. | $C_6H_5OH$ | 2-phenyl-4-vinyl-5-cyanotrimellitate. | 71 |

*Example 15.—Preparation of 1,2-dibutyl-4-vinyl trimellitate*

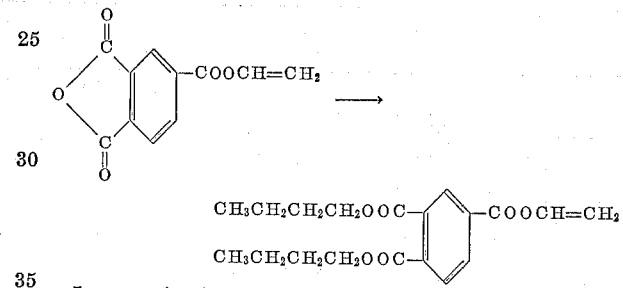

Into a suitable reaction vessel is charged 10.8 parts of vinyl trimellitate-1,2-anhydride, 7.4 parts of n-butanol, 150 parts of dry toluene and 0.25 part of p-toluenesulfonic acid. The mixture is refluxed under a Dean-Stark trap for 24 hours, at which time the theoretical amount of water is removed. Following the reaction, the p-toluenesulfonic acid is removed by extraction and the solvent stripped off leaving 9.4 parts of red-brown oil which cannot be distilled. The infrared spectrum of this material confirms the production of 1,2-dibutyl-4-vinyltrimellitate. The yield is 91%.

Following the procedure of Example 15, various diester derivatives are produced as set forth below in Table III.

TABLE III

| Example | Feed Material | Alcohol | Product | Percent yield |
|---|---|---|---|---|
| 16 | Vinyl-3-chlorotrimellitate-1,2-anhydride. | $CH_3OH$ | 1,2-dimethyl-4-vinyl-3-chlorotrimellitate. | 90 |
| 17 | Vinyl-5-cyanomellitate-1,2-anhydride. | $C_6H_5OH$ | 1,2-diphenyl-4-vinyl-5-cyanotrimellitate. | 86 |
| 18 | Vinyl-6-isobutyltrimellitate-1,2-anhydride. | $C_{10}H_7OH$ | 1,2-dinaphthyl-4-vinyl-6-isobutyltrimellitate. | 71 |

*Example 19.—Preparation of 1,2-dimethyl-4-vinyl trimellitate*

To a suitable reaction vessel are added 23.6 parts of the 4-vinyl trimellitate produced in Example 6 and 12.8 parts of methanol, 150 parts of dry toluene and 0.25 part of p-toluene sulfonic acid. The mixture is refluxed under a Dean-Stark trap for 24 hours, at which time the theoretical amount of water is removed. Following the reaction, the p-toluenesulfonic acid is removed by extraction and the solvent stripped off leaving 23.0 parts of light yellow oil identified by infrared spectrum analysis as 1,2-dimethyl-4-vinyltrimellitate.

*Example 20.—Preparation of 1-methyl-2-butyl-4-vinyltrimellitate*

To a suitable reaction vessel are added 21.8 parts of vinyl trimellitate-1,2-anhydride and 64 parts of dry methanol. The reaction proceeds as in Example 11 and 21 parts of the monoester derivative is recovered. To this monoester is added 10 parts of butanol and 150 parts of dry toluene, in a second reaction vessel. 0.25 part of p-toluenesulfonic acid is added and the reaction vessel is heated to reflux under a Dean-Stark trap for 12 hours until the theoretical amount of water is removed. The p-toluenesulfonic acid and toluene are removed by extraction leaving the title compound. The yield is 86%.

*Example 21.—Preparation of vinyl-3,4-dicarbamoyl benzoate*

Into a suitable reaction vessel are charged 26.4 parts of the diester produced in Example 19 and 200 parts of a 20% solution of ammonium hydroxide. The reaction is conducted at 50° C. and is allowed to continue for 36 hours. After purification of the resultant product by crystallization, a yield of 86% of vinyl-3,4-dicarbamoyl benzoate is recovered.

Following the procedure of Example 21, the following amide derivatives are produced as set forth in Table IV below.

*Example 29*

Poly(vinyl-5-cyanotrimellitate-1,2-anhydride) is recovered in a yield of 89% utilizing the procedure of Example 26 except that 0.5 part of azobisisobutyronitrile is used as the catalyst.

*Example 30.—Copolymerization of vinyl trimellitate-1,2-anhydride and acrylonitrile*

Five parts of vinyl trimellitate-1,2-anhydride and 50 parts of acrylonitrile are charged to a suitable reaction vessel containing 900 parts of water, 1.7 parts ammonium persulfate and 0.7 part of sodium metabisulfite. The polymerization is run 4 hours at 35° C. and a white solid polymer is recovered by filtration in a yield of 96%. Fifty parts of the polymer are spun into a fiber by a standard method. The resultant fiber has excellent dyeability. The remaining fifty parts of polymer are cast from a dimethyl formamide solution onto a steel plate and solvent evaporated at 100° C. for 36 hours in a dry box. The resultant film is clear and has excellent adherence to the steel plate.

TABLE IV

| Example | Feed material | Nitrogen compound | Product | Percent yield |
|---|---|---|---|---|
| 22 | 1,2-dimethyl-4-vinyl-3-chlorotrimellitate. | Methylamine. | Vinyl-2-chloro-3,4-bis(methylcarbamoyl)benzoate. | 82 |
| 23 | 1,2-dibutyl-4-vinyltrimellitate. | Isobutylamine. | Vinyl-3,4-bis(isobutylcarbamoyl)benzoate. | 69 |
| 24 | 1,2-dimethyl-4-vinyl-5-cyanotrimellitate. | Aniline. | Vinyl-6-cyano-3,4-bis(phenylcarbamoyl)benzoate. | 62 |
| 25 | 1-methyl-2-butyl-4-vinyl-3-methyltrimellitate. | Naphthylamine. | Vinyl-2-methyl-3,4-bis(naphthylcarbamoyl)benzoate. | 64 |

*Example 26.—Homopolymerization of vinyl trimellitate-1,2-anhydride*

To a suitable reaction vessel are added 100 parts of vinyl trimellitate-1,2-anhydride and 1 part of benzoyl peroxide. The reaction media is heated to 75° C. and the reaction is allowed to continue for 2 hours whereupon the reaction media begins to become very viscous. After another hour of reaction, the resultant polymer is recovered by filtration in a yield of 96%.

*Example 27*

Utilizing the procedure of Example 26, a yield of 90% of homopolymeric vinyl-3-bromotrimellitate-1,2-anhydride is recovered after 4 hours of reaction.

*Example 31.—Copolymerization of vinyl-3-methyltrimellitate-1,2-anhydride with methyl methacrylate*

Ten parts of vinyl-3-methytrimellitate-1,2-anhydride and 20 parts of methyl methacrylate are added to a suitable reaction vessel with a redox catalyst system of 1.7 parts of ammonium persulfate and 0.7 part of sodium bisulfite. The temperature is raised to 60° C. for a one hour period and a white copolymer is produced and recovered py filtration in a yield of 98%.

Following the procedure of Examples 26, 30, and 31, various vinyl trimellitates-1,2-anhydrides and their diesters, diacids, monoesters and diamides are homopolymerized and copolymerized with vinyl monomers to produce the novel polymers of the present invention. The results are set forth in Table V below.

TABLE V

| Ex. | Monomer | Pts. | Comonomer | Pts. | Example followed | Percent yield |
|---|---|---|---|---|---|---|
| 32 | Vinyl-5-bromotrimellitate-1,2-anhydride. | 50 | Styrene. | 50 | 30 | 92 |
| 33 | Vinyl-6-cyanotrimellitate-1,2-anhydride. | 30 | Acrylamide. | 70 | 31 | 81 |
| 34 | Vinyl-3-t-butyltrimellitate-1,2-anhydride. | 10 | do. | 90 | 31 | 77 |
| 35 | 4-vinyl trimellitate. | 100 | | | 26 | 93 |
| 36 | 4-vinyl-6-bromotrimellitate. | 100 | | | 26 | 89 |
| 37 | 4-vinyl-3-iso-butyltrimellitate. | 50 | p-Methyl styrene. | 50 | 30 | 72 |
| 38 | 1,2-dimethyl-4-vinyl trimellitate. | 100 | | | 26 | 96 |
| 39 | 1,2-diphenyl-4-vinyl trimellitate. | 100 | | | 26 | 88 |
| 40 | 1,2-diphenyl-4-vinyl trimellitate. | 10 | Methylmethacrylate. | 90 | 31 | 94 |
| 41 | 1-methyl-2-butyl-4-vinyl trimellitate. | 100 | | | 26 | 91 |
| 42 | Vinyl-3,4-di-carbamoyl benzoate. | 100 | | | 26 | 85 |
| 43 | do. | 40 | Ethyl acrylate. | 60 | 30 | 67 |
| 44 | Vinyl-3,4-bis-(propylcarbamoyl)-benzoate. | 5 | Styrene. | 95 | 30 | 72 |
| 45 | 1,2-diphenyl-4-vinyl-5-cyano trimellitate. | 5 | do. | 95 | 30 | 70 |
| 46 | 1-methyl-4-vinyl trimellitate. | 10 | Methyl methacrylate. | 90 | 30 | 81 |

*Example 28*

Again following the procedure of Example 26, vinyl-n-butyltrimellitate-1,2-anhydride is homopolymerized. The yield of polymeric product is 86%.

*Example 47*

Into a suitable reaction vessel equipped with stirrer, thermometer, gas inlet tube and distillation trap are added 22 parts of vinyl trimellitate-1,2-anhydride, 15 parts of trimethylol propane and 18 parts of neopentyl glycol. The mixture is heated slowly to 150° C. while slowly passing a stream of $CO_2$ therethrough. The reaction is allowed to proceed for two hours and the vessel is then cooled to room temperature. A clear, colorless, very viscous polyester syrup is recovered. The polyester is contacted with 10 parts of styrene and 0.2 part of hydroquinone as a polymerization inhibitor. The mixture is heated to 150° C. after casting it on a glass plate. The resultant film is clear, hard and has excellent scratch resistance.

The following table sets forth various materials employed in the formation of polyester resins from the novel vinyl trimellitate-1,2-anhydride of the present invention. In each instance the procedure of Example 47 was followed.

TABLE VI

| Ex. | Anhydride feed | Other monomers present | Cross-linking agent |
|---|---|---|---|
| 48 | Vinyl-3-chlorotrimellitate-1,2-anhydride—25 pts. | Triethylene glycol 15 pts.—adipic acid 30 pts. | p-Methyl styrene. |
| 49 | Vinyl-3-methyltrimellitate-1,2-anhydride—23 pts. | Pentanediol-1,3 15 pts.—pentaerythritol 20 pts. | Diallyl phthalate. |

I claim:
1. A process for the vinylation of a trimellitic anhydride which consists of (A) reacting (1) an anhydride compound having the formula

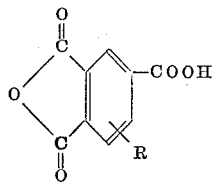

wherein R is selected from the group consisting of hydrogen, a halogen radical, a cyano radical and a lower alkyl radical having from 1 to 4 carbon atoms, inclusive, with (2) from about 2% to about 20%, by weight, based on the weight of said anhydride, of a compound selected from the group consisting of zinc oxide, cadmium oxide, zinc acetate and cadmium acetate, at a temperature of at least 300° C. and (B) reacting, in an inert atmosphere, (3) the reaction media resulting from (A) with (4) acetylene, under an acetylene partial pressure ranging from about 150 p.s.i. to about 400 p.s.i. and at a temperature of at least 200° C.

2. A process for the vinylation of a trimellitic anhydride which consists of (A) reacting (1) an anhydride compound having the formula

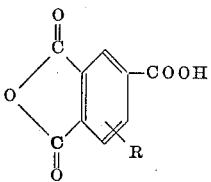

wherein R is selected from the group consisting of hydrogen, a halogen radical, a cyano radical and a lower alkyl radical having from 1 to 4 carbon atoms, inclusive, with (2) from about 20% to about 20%, by weight, based on the weight of said anhydride, of zinc oxide, at a temperature of at least 300° C. and (B) reacting, in an inert atmosphere, (3) the reaction media resulting from (A) with (4) acetylene, under an acetylene partial pressure ranging from about 150 p.s.i. to about 400 p.s.i. and at a temperature of at least 200° C.

3. A process for the vinylation of a trimellitic anhydride which consists of (A) reacting (1) an anhydride compound having the formula

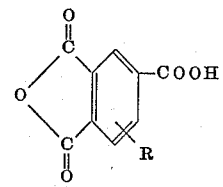

wherein R is selected from the group consisting of hydrogen, a halogen radical, a cyano radical and a lower alkyl radical having from 1 to 4 carbon atoms, inclusive, with (2) from about 2% to about 20%, by weight, based on the weight of said anhydride, of a compound selected from the group consisting of zinc oxide, cadmium oxide, zinc acetate and cadmium acetate, at a temperature ranging from about 325° C. to about 400° C. and (B) reacting, in an inert atmosphere, (3) the reaction media resulting from (A) with (4) acetylene, under an acetylene partial pressure ranging from about 250 p.s.i. to about 350 p.s.i. and at a temperature ranging from about 225° C. to about 300° C.

4. A process for the vinylation of trimellitic acid-1,2-anhydride to produce vinyl trimellitate-1,2-anhydride which consists of (A) reacting (1) trimellitic acid-1,2-anhydride with (2) from about 2% to about 20%, by weight, based on the weight of said anhydride, of zinc oxide at a temperature of at least 300° C. and (B) reacting, in an inert atmosphere, (3) the reaction media resulting from (A) with (4) acetylene, under an acetylene partial pressure ranging from about 150 p.s.i. to about 400 p.s.i. and at a temperature of at least 200° C.

References Cited by the Examiner

UNITED STATES PATENTS 2,342,463  2/44  Fischer et al. _____ 260—485
3,063,969  11/62  Stephens et al. _____ 260—78.4

OTHER REFERENCES

Amoco: "Trimellitate Anhydride," 1958, Chemicals C. 2.

NICHOLAS S. RIZZO, *Primary Examiner.*
DONALD E. CZAJA, *Examiner.*

UNITED STATES PATENT OFFICE
CERTIFICATE OF CORRECTION

Patent No. 3,207,765            September 21, 1965

Philip John Paré

It is hereby certified that error appears in the above numbered patent requiring correction and that the said Letters Patent should read as corrected below.

Column 6, line 19, for "a" read -- is --; column 16, line 43, for "py" read -- by --; column 18, line 1, for "20%", first occurrence, read -- 2% --.

Signed and sealed this 3rd day of May 1966.

(SEAL)
Attest:

ERNEST W. SWIDER
Attesting Officer

EDWARD J. BRENNER
Commissioner of Patents